(No Model.)
R. A. JOHNSON.
Cultivator and Scraper.
No. 232,133. Patented Sept. 14, 1880.
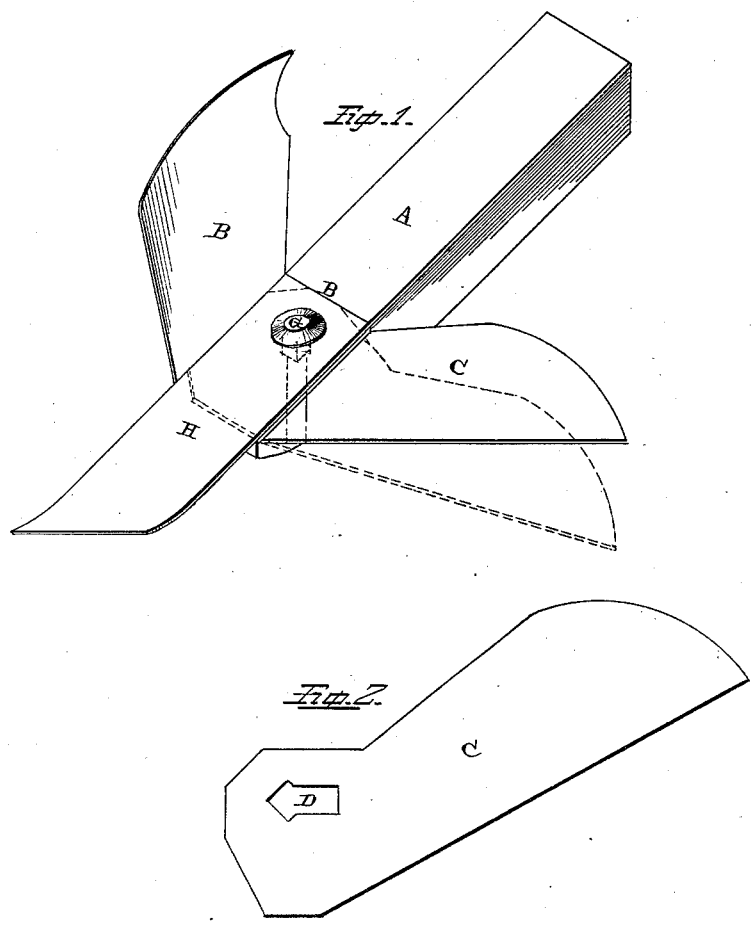

United States Patent Office.

RICHARD A. JOHNSON, OF NEWNAN, GEORGIA.

CULTIVATOR AND SCRAPER.

SPECIFICATION forming part of Letters Patent No. 232,133, dated September 14, 1880.

Application filed July 22, 1880. (No model.)

*To all whom it may concern:*

Be it known that I, RICHARD A. JOHNSON, of Newnan, in the county of Coweta and State of Georgia, have invented certain new and useful Improvements in Cotton Cultivators and Scrapers; and I do hereby declare the following to be a full, clear, and exact description of the invention, such as will enable others skilled in the art to which it pertains to make and use it, reference being had to the accompanying drawings, which form part of this specification.

My invention relates to an improvement in cotton scrapers and cultivators, and is intended as an improvement upon the patent granted to me June 29, 1880, bearing number 229,318; and it consists in making the wing which acts as a scraper and the wing which serves to protect the growing cotton from the dirt in two separate and distinct pieces, and forming in the wing which acts as a scraper a peculiar-shaped slot, whereby this wing can be adjusted into different positions, according to the use which is required of it, as will be more fully described hereinafter.

The object of this invention is to make the wing adjustable, so that it can either be raised up sufficiently high to carry the dirt and weeds over to the middle of the row between the cotton-plants, or can be turned downward far enough to act as a scraper and cut the weeds away.

Figure 1 is a perspective of my invention, showing the wing in one position in solid lines and in the other position in dotted lines. Fig. 2 is a plan view of the slotted wing by itself.

A represents the standard, which has a shoulder or offset, B, made upon its front side, and against which the upper edges of the two wings B C bear. These two wings B C, instead of being made in one solid piece, as shown in my former patent, are made in two separate and distinct pieces, and the wing C, which is intended to act as a scraper, or to carry the displaced dirt and weeds over toward the center of the row between the cotton-plants, is provided with the peculiar-shaped slot D shown in Fig. 2. This slot is formed of the shape shown, so that either end of the slot will fit over the square portion of the bolt G, which secures the two wings and the shovel H to the standard.

When the wing is so turned that the inner end of the slot fits over the square part of the bolt the wing is turned upward at such an angle that it carries the dirt and the weeds which have been displaced by the shovel over toward the middle of the row between the cotton-plants. When, however, the outer end of the slot, which has its sides turned at an angle to the sides of the other portion of the slot, is fitted over the bolt, the outer portion of the wing is turned downward, so as to act as a scraper to cut away the weeds and the plants which are growing in between the rows of cotton. The inner end of this wing C has the two corners cut away, as shown at I, so that when it is turned downward so as to form a scraper one of those cut-away corners bears against the shoulder on the standard, and the other corner bears against the inner side of the wing B.

By thus making the two wings B C in separate pieces and providing the wing C with a slot, whereby it can be adjusted, as shown, it can be used either as a scraper or simply as a wing to move the displaced dirt and the weeds over to the middle of the row between the plants, which will be found a great convenience to all cultivators of cotton.

If so desired, the wing B may be entirely dispensed with and the wing C used by itself when a scraper alone is wanted, or a second wing, C, used in the place of the wing B, and then there will be an adjustable wing on each side of the standard.

The two wings, or either of them, may be secured to the standard on the outside of the plow point or shovel, or behind it, as may be preferred, and either by the same bolt that secures the plow-point in position or by a separate one.

Having thus described my invention, I claim—

In a cotton cultivator and scraper, the combination of the standard A, wing B for protecting the young plants from the dirt, wing C, having the slot D, the bolt G, and shovel H, the slot D in the wing C being of such a shape that the wing can be adjusted into different positions, substantially as shown.

In testimony that I claim the foregoing I have hereunto set my hand this 10th day of July, 1880.

RICHARD A. JOHNSON.

Witnesses:
JNO. I. ALEXANDER,
HILL BENTON.